A. A. HAUTY.
HOLDER AND MEASURING DEVICE FOR GRANULAR MATERIAL.
APPLICATION FILED MAR. 1, 1909.
950,286.
Patented Feb. 22, 1910.
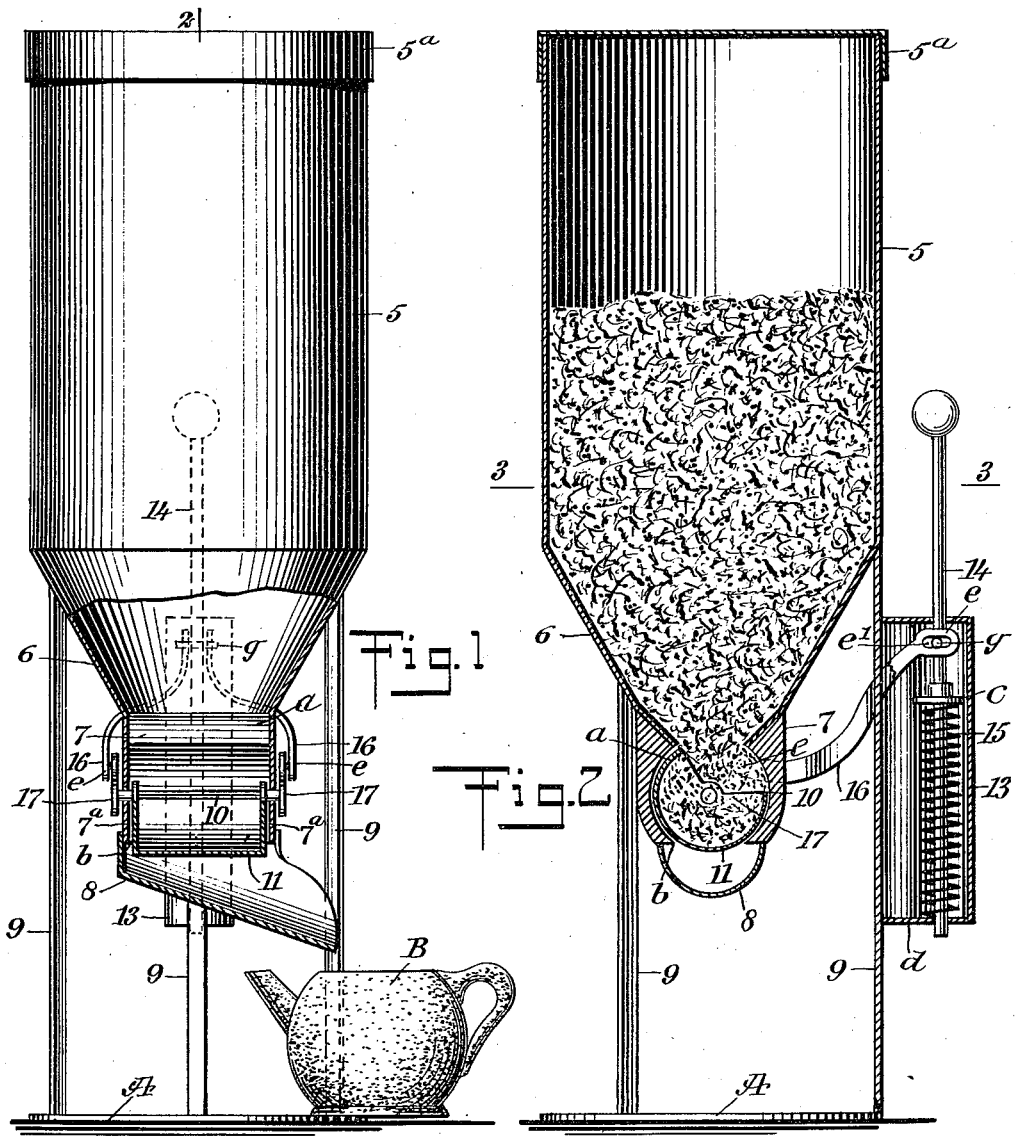
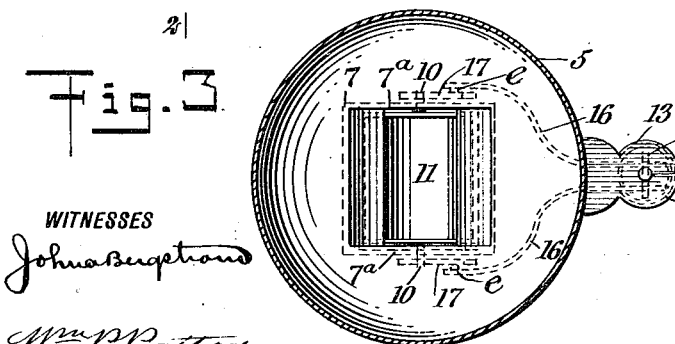
WITNESSES
INVENTOR
Albert A. Hauty
BY
ATTORNEYS

UNITED STATES PATENT OFFICE.

ALBERT AUGUST HAUTY, OF CHICAGO, ILLINOIS.

HOLDER AND MEASURING DEVICE FOR GRANULAR MATERIAL.

950,286.  Specification of Letters Patent.  Patented Feb. 22, 1910.

Application filed March 1, 1909. Serial No. 480,523.

*To all whom it may concern:*

Be it known that I, ALBERT A. HAUTY, a citizen of the United States, and a resident of Chicago, in the county of Cook and State of Illinois, have invented a new and Improved Holder and Measuring Device for Granular Material, of which the following is a full, clear, and exact description.

The purpose of the invention is to provide a receptacle for granular material such as tea, and combine therewith novel, simple and convenient means for measuring and discharging a certain quantity of the contents of the receptacle into a vessel for use.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a partly sectional side elevational view of the improvement; Fig. 2 is a vertical sectional view of the device, taken substantially on the line 2—2 in Fig. 1; and Fig. 3 is a sectional plan view, substantially on the line 3—3 in Fig. 2.

In the drawings, 5 represents a canister for containing granular substance such as tea in commercial form. The canister 5 is cylindrical, preferably formed of a suitable sheet metal, and has suitable dimensions for holding a quantity of tea or the like. The upper end of the canister is closed by a removable cover $5^a$ and a proper distance below said upper end the body of the receptacle is gradually contracted so as to render a portion thereof coniform, as is indicated at 6, in Figs. 1 and 2.

Depending from the lower end of the short coniform wall 6 is a rectangularly walled neck piece 7, wherein is a transversely formed cylindrical bore $a$, said bore cutting through the upper and lower walls of the neck piece 7 so as to produce a passage therethrough. Covering the lower opening $b$ in the defining wall of the bore $a$, a laterally extended spout 8 is affixed by its upper edges upon the lower portion of the neck 7, and this spout is adapted for receiving material from the canister 5, when the opening $b$ is uncovered.

A plurality of upright spaced legs 9, are secured by their upper ends on the lower portion of the canister body 5, said legs having an equal length that adapts them for the support of the canister above a level base A, a distance that will permit the introduction of a vessel B, below the free end of the inclined spout 8, while the vessel seats upon the base A.

A transverse shaft 10 is journaled near its ends in opposite perforations in the parallel side walls $7^a$ of the neck portion 7, said side walls being positioned at the respective ends of the transverse bore $a$, or the shaft may be dispensed with and opposite trunnions employed in lieu thereof. Upon the shaft 10, a chambered gate valve 11 curved to fit the bore of the neck 7, is mounted and secured, said shaft passing through perforations in the end walls of said gate valve at their transverse centers and near the free upper edges thereof, as is clearly shown in Fig. 1. The relative dimensions of the gate valve 11 are such, that its side wall has a loose contact with the defining circular wall of the bore $a$ in the neck piece 7, and as the perforations in the walls $7^a$ that receive the end portions of the shaft 10, are central in these end walls with relation to said defining wall, it will be seen that if the gate valve 11 is rocked on the journals at the ends of the shaft 10, said valve will close the upper opening in the neck portion 7, and seal the lower end of the canister 5. Further, if the gate valve 11 is rocked down into the position shown in Figs. 1 and 2, the upper opening in the neck piece 7 will be unsealed, and the gate valve will receive a filling of the granular material from the canister through said opening in its bottom.

In a casing 13, that is secured on one of the legs 9, a pusher rod 14, is slidably supported by its loose insertion through opposite perforations in the upper and lower walls of said casing. A collar $c$ is secured on the pusher rod 14, within the casing 13, and between said collar and the lower end wall $d$ of the casing, a spiral spring 15 is placed on the pusher rod and normally holds said rod in upward sliding adjustment.

Through the side wall of the casing 13 that is nearest to the neck piece 7, two links 16 are loosely inserted, said links being preferably curved edgewise as shown in Fig. 2, and sidewise as appears by full and dotted lines in Figs. 1 and 3. The end portions $e$ of the links 16, that are located in the casing 13, have opposite longitudinal slots $e'$ therein, as appears for one link in Fig. 2, and through said opposite slots and through an alined perforation in the pusher rod 14, a connecting pin $g$ is inserted and secured. The slots in the links permit play of the links on the pins so that binding of the rod 14 is prevented and the downward movement of the links with the rod permitted. The laterally bent portions of the links 16 that extend from the casing 13, toward the opposite end walls $7^a$ of the neck 7, respectively, are pivoted upon the upper ends of two similar arms 17, which extend down toward end portions of the transverse shaft 10 that project outside of the end walls $7^a$, and said depending ends of the arms are secured on said ends of the shaft as is indicated in Figs. 1 and 3. The tension of the spring 15, normally raises the slotted ends of the links 16 into the position shown in Fig. 2, which rockably disposes the gate valve 11 so that it closes the lower opening $b$ in the neck 7, and of course permits tea or other granular contents of the canister 5, to descend by gravity and fill the concavity of the gate valve.

It will be seen that a depression of the pusher rod 14, by applied pressure on the upper end thereof, will vibrate the links 16, and rock the gate valve upwardly, thus discharging its contents into the spout 8, from which the measured material will slide by gravity into the vessel B, and upon releasing pressure on the pusher rod 14, this spring pressed rod will resume its normal position, and through the links 16, rock the gate valve 11, so as to seal the lower portion of the canister 5.

It is claimed for the invention, that a great advantage is secured in the matter of convenience, preservation of the contents of the canister from the air, thus preventing loss of strength, and its protection from disease germs, as there is no exposure or handling of the tea necessary, while it is contained in the canister or during its removal therefrom.

Having thus described my invention, I claim as new, and desire to secure by Letters Patent:

1. A device of the character described, comprising a canister having a coniform lower portion and provided with a neck having a cylindrical bore cutting through the upper and lower walls of the neck, a chambered valve pivoted in the bore of the neck, an arm on the pivot of the valve at each end thereof, a sliding and spring pressed operating rod, and links having one end pivoted to the said arms and their other ends loosely connected with said rod.

2. A device of the character described, comprising a receptacle having a hopper-shaped bottom and provided with an extension below the bottom, a chambered gate valve pivoted in the said extension, arms on the pivot of the valve at the ends thereof, a sliding and spring pressed operating rod provided with pins projecting from opposite sides, and links having one end pivoted to the said arms and provided at their other ends with slots receiving the pins of the said rod.

3. In a device of the character described, the combination with an upright canister and a hollow rockable measuring and discharging gate that normally closes the open lower end of the canister, of means for rocking the hollow gate, comprising two arms secured at corresponding ends of the hollow gate, links having one end pivoted to the said arms, a casing supported at one side and below the canister and into which the other ends of the links extend, an upright pusher rod reciprocal in the casing, said rod being loosely connected with ends of the links, a collar on the rod in the casing, and a spring pressing on the collar and the lower end of the casing.

In testimony whereof I have signed my name to this specification in the presence of two subscribing witnesses.

ALBERT AUGUST HAUTY.

Witnesses:
E. PERCY MAYNARD,
P. M. ARTHUR.